(12) United States Patent
Aibester et al.

(10) Patent No.: US 12,229,439 B1
(45) Date of Patent: Feb. 18, 2025

(54) POWER-OPTIMIZED AND SHARED BUFFER

(71) Applicant: MELLANOX TECHNOLOGIES, LTD., Yokneam (IL)

(72) Inventors: Niv Aibester, Herzliya (IL); Eyal Srebro, Kfar Yehoshua (IL); Liron Mula, Hertzliya (IL); Amit Kazimirsky, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 28 days.

(21) Appl. No.: 18/229,509

(22) Filed: Aug. 2, 2023

(51) Int. Cl.
*G06F 3/06* (2006.01)
*G06F 1/3234* (2019.01)
*H04L 49/90* (2022.01)

(52) U.S. Cl.
CPC .......... *G06F 3/0656* (2013.01); *G06F 3/0604* (2013.01); *G06F 3/0679* (2013.01); *G06F 1/3275* (2013.01); *H04L 49/90* (2013.01)

(58) Field of Classification Search
CPC .... G06F 3/0656; G06F 3/0604; G06F 3/0679; G06F 1/3275; G06F 1/3278; H04L 49/90; H04L 49/9005; H04L 49/9036; H04L 49/9047; H04L 49/9068
See application file for complete search history.

(56) References Cited

U.S. PATENT DOCUMENTS

| 5,909,547 | A | * | 6/1999 | Mitra | H04L 49/105 709/213 |
|---|---|---|---|---|---|
| 11,171,884 | B2 | | 11/2021 | Mula et al. | |
| 11,500,737 | B2 | | 11/2022 | Aibester et al. | |
| 11,558,316 | B2 | | 1/2023 | Mula et al. | |
| 2007/0106860 | A1 | * | 5/2007 | Foster, Sr. | G06F 1/3275 711/170 |
| 2007/0288776 | A1 | * | 12/2007 | DeMent | G06F 1/3275 713/320 |
| 2019/0042157 | A1 | * | 2/2019 | Bonen | G06F 13/1668 |
| 2022/0045972 | A1 | | 2/2022 | Aibester et al. | |
| 2023/0022037 | A1 | | 1/2023 | Aibester et al. | |
| 2023/0120745 | A1 | | 4/2023 | Aibester et al. | |
| 2023/0138522 | A1 | | 5/2023 | Aibester et al. | |

FOREIGN PATENT DOCUMENTS

WO   WO-2023186809 A1 * 10/2023 ........... G06F 1/3275

* cited by examiner

*Primary Examiner* — Charles Rones
*Assistant Examiner* — Hewy H Li
(74) *Attorney, Agent, or Firm* — Sheridan Ross, PC

(57) ABSTRACT

A network device, a network interface controller, and a switch are provided. In one example, a shared buffer includes a plurality of cells of memory, one or more ports read data from the shared buffer and write data to the shared buffer, and a controller circuit selectively enables and disables cells of memory of the shared buffer based on an amount of data stored in the shared buffer. Power consumption of the shared buffer is in proportion to a number of enabled cells of memory.

20 Claims, 5 Drawing Sheets

POWER-OPTIMIZED AND SHARED BUFFER

FIELD OF THE DISCLOSURE

The present disclosure is generally directed toward networking and, in particular, toward networking devices, switches, and methods of operating the same.

BACKGROUND

Switches and similar network devices represent a core component of many communication, security, and computing networks. Switches are often used to connect multiple devices, device types, networks, and network types.

Devices including but not limited to personal computers, servers, or other types of computing devices, may be interconnected using network devices such as switches. These interconnected entities form a network that enables data communication and resource sharing among the nodes. While a particular switch may be capable of handling large amounts of data, often, switches do not operate at full capacity. As a result, conventional switches consume excessive amounts of power which may be unnecessarily high during periods of low traffic.

BRIEF SUMMARY

In accordance with one or more embodiments described herein, a computing system, such as a switch, may enable a diverse range of systems, such as switches, servers, personal computers, and other computing devices, to communicate across a network. A plurality of blocks or memory of the computing system may function as a shared buffer, allowing multiple ports of the computing system to share buffer space, while blocks of the buffer are selectively enabled and disabled based as least in part on an amount of data stored in the shared buffer.

Each port of the computing system may be associated with an ingress queue of packets and/or data in other formats received via the port. Each port may store the data in one or more blocks of memory of a shared buffer. A shared buffer control and accounting system may be used to control which port writes to and/or reads from which particular block of the shared buffer.

Shared buffer rebalancing as described herein enabled buffer-fragments or memory blocks to be bound and create a monolithic shared buffer. A shared buffer may include a plurality of random-access memory (RAM) devices. Each RAM device may be disabled or deactivated by placing the RAM device on standby. RAM devices may be enabled to absorb microbursts (µBursts) of data to avoid congestion.

A shared buffer accounting system may be enabled to generate on-the-fly feedback to a rebalancing system. The shared buffer accounting system may be capable of determining a portion of the shared buffer which is or is not required. The rebalancing system may, based on the determined portion of the shared buffer which is or is not required, enable, or disable blocks of memory to save power and prevent leakage. Using a system as described herein, non-fully populated ports may fully share a buffer and blocks of the buffer may be disabled when possible to limit power usage.

As described herein, traffic may be selectively sent via one or more particular ports of a computing system based on a number of factors. By assessing factors and altering weights of ports or queues, switching hardware of a computing system may be enabled to route traffic through the computing system in a most effective manner.

The present disclosure describes a system and method for enabling a switch or other computing system to selectively enable and disable cells of memory of the shared buffer based at least in part on an amount of data stored in the shared buffer. Embodiments of the present disclosure aim to improve power efficiency and other issues by implementing an improved buffering approach. The buffering approach depicted and described herein may be applied to a switch, a router, or any other suitable type of networking device known or yet to be developed.

In an illustrative example, a network device is disclosed that includes circuits to selectively enable and disable cells of memory of the shared buffer based at least in part on an amount of data stored in the shared buffer. The network device includes a shared buffer comprising a plurality of cells of memory, one or more ports to one or more of read data from the shared buffer and write data to the shared buffer, and a controller circuit to selectively enable and disable cells of memory of the shared buffer based at least in part on an amount of data stored in the shared buffer. Power consumption of the shared buffer is in proportion to a number of enabled cells of memory.

In another example, a switch is disclosed that includes a shared buffer comprising a plurality of cells of memory; one or more ports to one or more of read data from the shared buffer and write data to the shared buffer; and a controller circuit to selectively enable and disable cells of memory of the shared buffer based at least in part on an amount of data stored in the shared buffer. Power consumption of the shared buffer is in proportion to a number of enabled cells of memory.

In yet another example, a network interface controller (NIC) is disclosed that includes a shared buffer comprising a plurality of cells of memory; one or more ports to one or more of read data from the shared buffer and write data to the shared buffer; and a controller circuit to selectively enable and disable cells of memory of the shared buffer based at least in part on an amount of data stored in the shared buffer. Power consumption of the shared buffer is in proportion to a number of enabled cells of memory.

Any of the above example aspects include wherein the controller circuit calculates a number of cells to one of enable and disable based on the amount of data stored in the shared buffer and a threshold.

Any of the above example aspects include wherein the threshold indicates a number of cells.

Any of the above example aspects include wherein the threshold is a dynamic threshold.

Any of the above example aspects include wherein the threshold is relative to one or more of a rate at which the one or more ports of the network device are capable of sending and receiving data and a quota for one or more packet flows.

Any of the above example aspects include wherein disabling cells of memory comprises switching off power to the cells.

Any of the above example aspects include wherein disabling cells of memory comprises putting the cells into a sleep mode.

Any of the above example aspects include wherein disabling cells of memory comprises closing logic connected to the cells.

Any of the above example aspects include wherein disabling cells of memory comprises putting the logic into an idle mode.

Any of the above example aspects include wherein the controller circuit calculates the amount of data stored in the shared buffer by tracking received and transmitted packets.

Any of the above example aspects include wherein the controller circuit enables cells of memory in response to one or more of the one or more ports receiving data and link activity.

Any of the above example aspects include wherein the controller circuit enables cells of memory in response to one or more of detecting an increase in the amount of data stored in the shared buffer and detecting a shared-buffer profile requires additional buffer.

Any of the above example aspects include wherein the controller circuit disables cells of memory in response to the one or more ports transmitting data.

Any of the above example aspects include wherein the controller circuit disables cells of memory in response to detecting a decrease in the amount of data stored in the shared buffer.

Any of the above example aspects include wherein the controller circuit selectively enables and disables cells of memory of the shared buffer by transmitting a signal to a controller in communication with the shared buffer.

Any of the above example aspects include wherein data received from a first port of the one or more ports is stored in the shared buffer prior to being transmitted by a second port of the one or more ports.

Any of the above example aspects include wherein the shared buffer is one of a plurality of shared buffers, and wherein the controller selectively enables and disables cells of memory of each of the shared buffers.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

Like reference numbers and designations in the various drawings indicate like elements.

DETAILED DESCRIPTION

Figure 1:
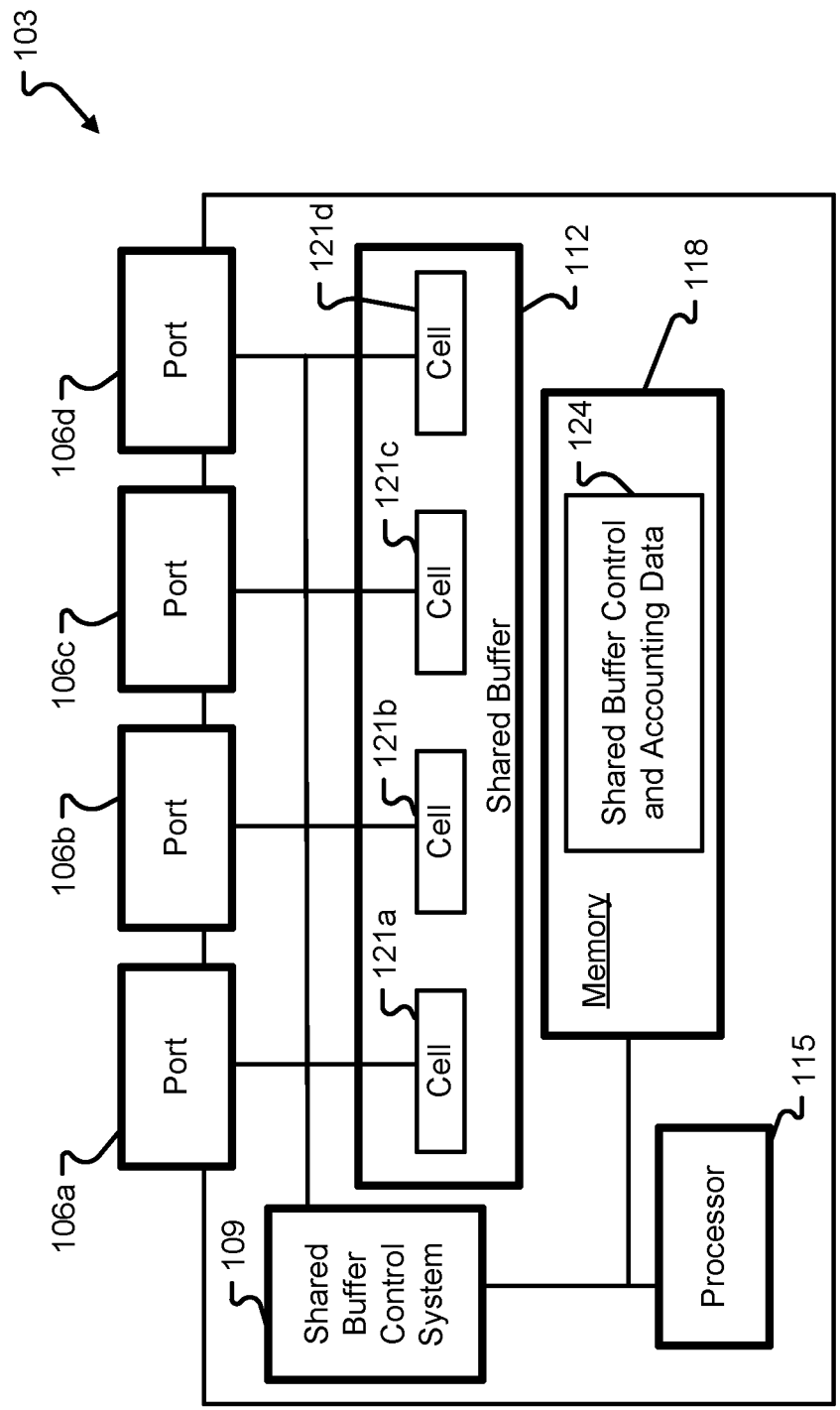
FIG. 1 is a block diagram depicting an illustrative configuration of a switch in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not to be deemed "material."

The terms "determine," "calculate," and "compute," and variations thereof, as used herein, are used interchangeably, and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-5, various systems, and methods for managing a shared buffer in a computing system will be described. The concepts of shared buffer management depicted and described herein can be applied to any type of computing system capable of receiving and/or transmitting data, whether the computing system includes one port or a plurality of ports. Such a computing system may be a switch, but it should be appreciated any type of computing system may be used. The term packet as used herein should be construed to mean any suitable discrete amount of digitized information. The data stored in a shared buffer may be in the form of a single packet, multiple packets, or non-packetized data without departing from the scope of the present disclosure. Furthermore, it should be appreciated that described features and functions of a centralized architecture may be applied or used in a distributed architecture or vice versa.

In accordance with one or more embodiments described herein, a switch 103 as illustrated in FIG. 1 enables a diverse range of systems, such as switches, servers, personal computers, and other computing devices, to communicate across a network. While the computing device of FIG. 1 is described herein as a switch 103, it should be appreciated the computing device of FIG. 1 may be any computing device capable of receiving data via ports 106a-d. Such a switch 103 as described herein may for example be a switch or any computing device comprising a plurality of ports 106a-d for connecting nodes on a network. Furthermore, while the systems and methods described herein relate to ingress data, it should be appreciated the same or similar systems may be performed for egress data to be sent by the switch 103 via a port 106a-d.

The ports 106a-d of the switch 103 may function as communication endpoints, allowing the switch 103 to manage multiple simultaneous network connections with one or more nodes. Each port 106a-d may be used to receive data associated with one or more flows or communication sessions. Each port 106a-d, upon receiving data, may be capable of writing the data to a cell 121a-d within a shared buffer 112. The ports 106a-d of the switch 103 may be physical connection points which allow network cables such as Ethernet cables to connect the switch 103 to one or more network nodes.

Once the packets (or data in other formats) are received by ports 106a-d of the switch 103, the packets may be temporarily stored in the shared buffer 112. The shared buffer 112 may comprise a temporary storage space within the switch 103. Physically, the storage space of the shared buffer 112 may comprise a plurality of cells 121a-d, or blocks, each of which may be, for example, a Random Access Memory (RAM) device. The shared buffer 112 may operate as an intermediary holding area, allowing for the switch 103 to manage and control the onward transmission of packets from the buffer 112.

The shared buffer may be of a particular amount of storage space, such as 156 MB, 256 MB, etc., and may comprise a plurality of RAM devices. Each RAM device may be a type of computer memory capable of being used to store data such as packets received via ports 106a-d. The smallest unit of RAM may be a cell 121a-d, and each cell stores a bit or byte of data. Each cell 121a-d in the shared buffer 112 may comprise a transistor and a capacitor. The transistor may operate as a switch that lets control circuitry of the switch read the capacitor or change its state. The capacitor may operate to hold a bit of information, either a 0 or a 1.

The shared buffer 112 may comprise cells anywhere within the switch 103. For example, the cells 121a-d may be parts of arrays or blocks of memory, such as 1 MB per block. Blocks of memory may contain cells 121a-d arranged in rows and columns.

The shared buffer 112 may comprise a RAM device organized into one or more arrays of cells. Such arrays may be further organized into rows and columns, creating a grid structure that allows for fast access to any cell 121a-d in the array.

Each cell 121a-d may be assigned a particular address which may be used by components of the switch 103 to access or instruct other components to access each particular cell 121a-d. When the processor needs to read or write a specific bit of data, it sends the corresponding memory address to the RAM. In some implementations, each block of the shared buffer 112 may be assigned an address and components may refer generally to a particular block as opposed to the more particular cell reference. In some implementations, the address of a cell 121a-d may indicate which block the cell 121a-d is in and a row and column for the cell 121a-d within the block. In this way, a processor 115, a shared buffer control system 109, and/or another component of the switch 103 may be enabled to refer to any particular cell 121a-d and/or all cells of a particular block of the shared buffer 112.

In some implementations, the cells 121a-d of the shared buffer 112 may form a single, fragmented logical unit. To a port 106a-d, the shared buffer 112 may appear to be a single unit of memory. Each port 106a-d may write data to any one of the cells 121a-d in the shared buffer memory 112 which are enabled or activated and not deactivated or disabled. Which cell 121a-d to which a particular port 106a-d writes a received packet may be controlled by a shared buffer control system 109. For example, the shared buffer control system 109 may instruct each port 106a-d to write to a particular cell 121a-d. In some implementations, the shared buffer control system 109 may be enabled to activate or deactivate particular cells 121a-d and/or particular blocks of the shared buffer 112 by either powering off the cells 121a-d or by instructing the ports 106a-d to write to a particular cell 121a-d or block of the shared buffer 112.

To read data from a cell 121a-d, control circuitry of the switch 103 may cause the transistor to allow the charge on the capacitor to flow out onto a bit line. Buffered packets may in some implementations be organized in queues, such as associated with a dedicated queue per egress port, as the packets await transmission.

The shared buffer control system 109 may be in communication with or controlled by a processor 115. For example, the switch 103 may comprise a processor 115, such as a central processing unit (CPU), a microprocessor, or any circuit or device capable of reading instructions from memory 118 and performing actions. The processor 115 may execute software instructions to control operations of the switch 103.

The processor 115 may function as the central processing unit of the switch 103 and execute operative capabilities of the switch 103. The processor 115 may communicate with other components of the switch 103, including the shared buffer control system 109, such as to manage and perform computational operations.

The processor 115 may be configured to perform a wide range of computational tasks. Capabilities of the processor 115 may encompass executing program instructions, managing data within the system, and controlling the operation of other hardware components such as shared buffer control system 109. The processor 115 may be a single-core or multi-core processor and might include one or more processing units, depending on the specific design and requirements of the switch 103. The design of the processor 115 may allow for instruction execution, data processing, and overall system management, thereby enabling the switch 103's performance and utility in various applications. Furthermore, the processor 115 may be programmed or adapted to execute specific tasks and operations according to application requirements, thus potentially enhancing the versatility and adaptability of the switch 103.

The switch 103 may also include one or more memory 118 components which may store data such as a shared buffer control and accounting data 124. Memory 118 may be configured to communicate with the processor 115 of the switch 103. Communication between memory 118 and the processor 115 may enable various operations, including but not limited to, data exchange, command execution, and memory management. In accordance with implementations described herein, memory 118 may be used to store data, such as shared buffer control and accounting data 124, relating to the usage of the cells 121a-d of the shared buffer 112 of the switch 103.

The memory 118 may be constituted by a variety of physical components, depending on specific type and design. Memory 118 may include one or more memory cells capable of storing data in the form of binary information. Such memory cells may be made up of transistors, capacitors, or other suitable electronic components depending on the memory type, such as dynamic random-access memory (DRAM), static random-access memory (SRAM), or flash memory. To enable data transfer and communication with other parts of the switch 103, memory 118 may also include data lines or buses, address lines, and control lines not illustrated in FIG. 1. Such physical components may collectively constitute the memory 118 and/or the shared buffer 112, contributing to their capacity to store and manage data, such as shared buffer control and accounting data 124.

Shared buffer control and accounting data 124, as which may be stored in memory 118, could encompass information about various aspects of shared buffer 112 usage. Such information might include data about current buffer usage, client demands, and historical buffer usage, among other things. Shared buffer control and accounting data 124 may include, for example, a current number of active cells 121a-d, a total number of cells 121a-d, a current number of inactive cells 121a-d, a current number of enabled cells 121a-d, a current number of disabled cells a-d, a threshold amount of data and/or a threshold number of cells 121a-d, a delta threshold, and/or other data, as described in greater detail below. The shared buffer control and accounting data 124 may be accessed and utilized by the processor 115 and/or the shared buffer control system 109 in managing operations of the shared buffer and ports 106a-d. For example, the processor 115 might utilize the shared buffer control and accounting data 124 to manage network traffic received by ports 106a-d by determining a number of cells to activate or deactivate which may be used by the shared buffer control system 109 to direct data from ports 106a-d to shared buffer 112 cells 121a-d of the switch 103 as described in greater detail below. Therefore, the memory 118, in potential conjunction with the processor 115, may play a crucial role in optimizing the usage and performance of the ports 106a-d of the switch 103.

In one or more embodiments of the present disclosure, a processor 115 or switching hardware 109 of a switch 103 may execute polling operations to retrieve data relating to activity of the cells 121a-d, such as by polling the cells 121a-d, the shared buffer 112, the shared buffer control and accounting data 124, the shared buffer control system 109, and/or other components of the switch 103 as described herein. As used herein, polling may involve the processor 115 periodically or continuously querying or requesting data from the shared buffer control system 109 or may involve the processor 115 or the shared buffer control system 109 periodically or continuously querying or requesting data from the cells 121a-d or from memory 118. The polling process may in some implementations encompass the processor 115 sending a request to the shared buffer control system 109 to retrieve desired data. Upon receiving the request, the shared buffer control system 109 may compile the requested data and send it back to the processor 115.

If, as described in greater detail below, a number of cells 121a-d of the shared buffer 112 are to be activated or deactivated, the processor 115 may be capable of instructing the shared buffer control system 109 to activate or deactivate the number of cells 121a-d such that a total number of active cells 121a-d of the shared buffer are operating to serve the ports 106a-d by storing received packets.

The processor 115 may also be capable of receiving information from remote peers such as other switches or devices connected to the switch 103 such as via the ports 106a-d. Such information may indicate a requested or demanded amount of buffer space such as may be required by one or more communications between the switch 103 and the remote peer. For example, if a communication session between a remote peer and the switch 103 requires a minimum buffer storage space, the remote peer may send information indicating as such to the switch 103. Such information may be received by the processor 115. The processor 115 may store such information and/or use such information to generating instructions for the shared buffer control system 109 of the switch 103.

The shared buffer 112 may be divided into units of cells and/or blocks of memory. Each cell 121a-d may store one bit or one byte of data. Each block may comprise one or more cells 121a-d. Total storage capacity 203 of the shared buffer 112 may be interpreted in terms of total number of cells 121a-d, blocks, bits, or bytes.

Figure 2:
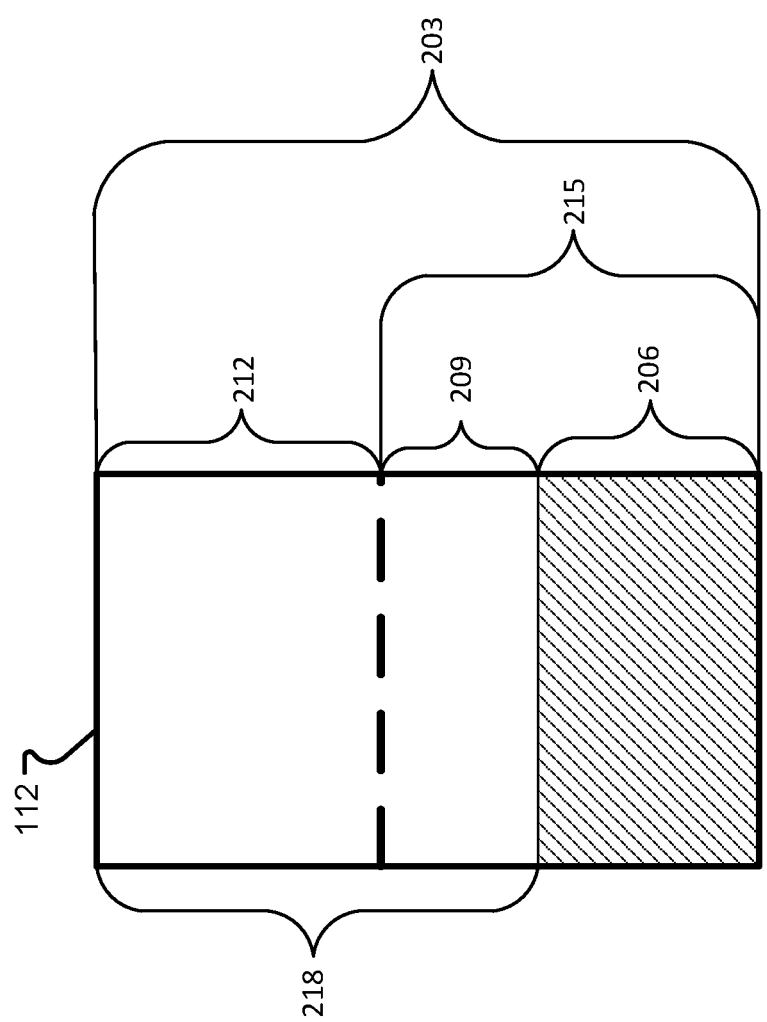
FIG. 2 is a block diagram depicting an illustrative configuration of a shared buffer in accordance with at least some embodiments of the present disclosure.

As illustrated in FIG. 2, the shared buffer 112 may have a total storage capacity 203 which may be a number equal to all cells 121a-d of the shared buffer 112, whether activated or deactivated. The shared buffer 112 may have a current amount of stored data 206 which may be a number of all activated cells 121a-d which currently store data waiting to be handled by the switch 103. The shared buffer 112 may also have a current amount of available storage space 218 which may be equal to the total storage capacity 203 minus the current amount of stored data 206 of the shared buffer 112.

The shared buffer 112 may also have a delta threshold 209 indicated by the space above the current amount of stored data 206 and below the dashed line 209. The delta threshold 209 may be a number of available cells 121a-d which are currently activated but unused. The number of cells 121a-d in the delta threshold 209 space may be a variable amount which may change depending on a number of factors as described below.

The sum of the current amount of stored data 206 and the delta threshold 209 may be considered a threshold level of data 215, as indicated by the dashed line. The threshold level of data 215 may be a total number of activated cells. As the delta threshold 209 and the current amount of stored data 206 change, the threshold level of data 215, being the sum of the current amount of stored data 206 and the delta threshold 209 may likewise change.

The shared buffer memory 112 may be operable to keep the total number of activated cells 121a-d of the shared buffer 112 equal to the threshold level of data 215. As such, the shared buffer memory 112 may activate or deactivate cells 121a-d of the shared buffer 112 to match the threshold level of data 215.

Because the total number of activated cells 121a-d of the shared buffer is set to be equal to the sum of the current amount of stored data 206 and the delta threshold 209, the shared buffer 112 may have a current number of deactivated cells 212 as illustrated by the space above the dashed line in FIG. 2. The current number of deactivated cells 212 may be equal to the total storage capacity 203 of the shared buffer 112 minus the threshold level of data 215.

Figure 3:
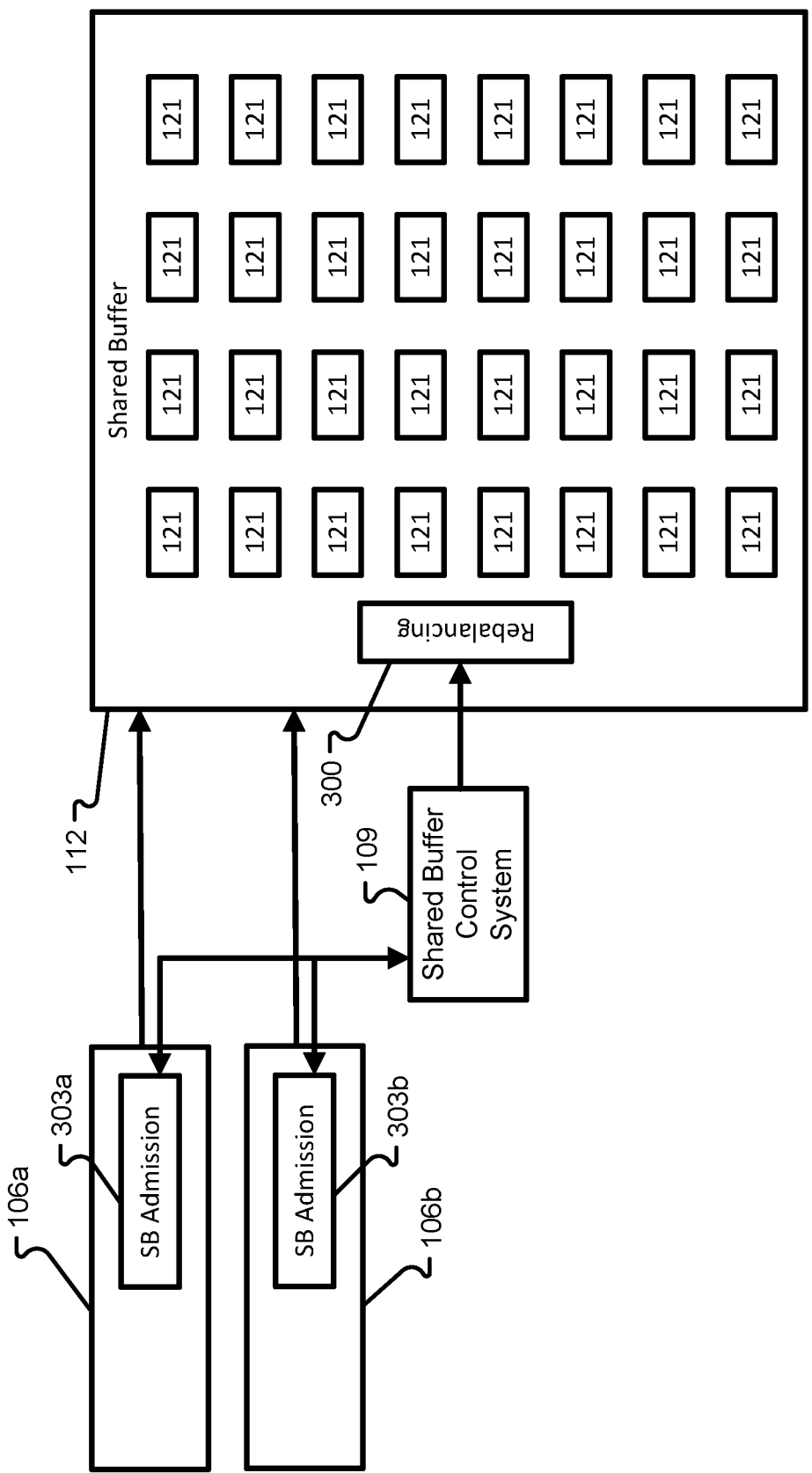
FIG. 3 is a block diagram depicting an illustrative configuration of a computing system including ports and a shared buffer in accordance with at least some embodiments of the present disclosure.

As illustrated in FIG. 3, ports 106a-b of a switch 103 may output data to a shared buffer 112. Each port 106a-b may write to a particular cell 121 of the shared buffer 112 based on instructions received by a shared buffer control system 109. The ports 106a-b may also report buffer usage to the shared buffer control system 109. For example, each port 106a-b may comprise or be in communication with a shared buffer admission system 303a-b. The shared buffer admission system 303a-b of each port 106a-b may be capable of determining to which cell 121 of the shared buffer 112 the respective port 106a-b writes each packet.

Using data received from the shared buffer admission system 303a-b of each port 106a-b, the shared buffer control system 109 may be capable of determining a current usage of the cells 121 of the shared buffer 109.

The shared buffer admission system 303a-b of each port 106a-b may also inform the shared buffer control system 109 about quota occupancy, required pool size, microburst (μBurst), and other information received from remote peers which may affect a delta threshold 209 of the switch 103.

As described herein, data, such as packets, may be sent via a particular one or more of the ports 106a-b to cells 121 of the shared buffer 112 selectively based on a number of factors. A shared buffer control system 109 of the switch 103 may comprise one or more application-specific integrated circuits (ASICs) or microprocessors to perform tasks such as determining to which cell 121 a received packet should be sent, or a port 106a-b should send a next received packet. The shared buffer control system 109 may comprise various components including, for example, port controllers that manage the operation of individual ports, network interface cards that facilitate data transmission, and internal data paths that direct the flow of data within the switch 103. The shared buffer control system 109 may also include memory elements to temporarily store data and management software to control the operation of the switch 103. Such a configuration may enable the shared buffer control system 109 to accurately track shared buffer usage and provide data to the processor 115 of the switch 103 upon request.

The shared buffer control system 109 may control the management and rebalancing of the shared buffer 112 by governing which port writes to each block of the shared buffer. The decision as to which port 106 writes to which cell 121 of the shared buffer 112 may be based on factors such as occupancy of the shared buffer 112, quotas, required pool-size, μBurst conditions, etc. The shared buffer control system 109 may be enabled to effectively adjust a number of active cells 121 in the shared buffer 112 by either instructing a port 106a to write to a particular cell 121 of the shared buffer 112 or instructing a rebalancing system 300 of the or in communication with the shared buffer 112 to enable or disable cells 121.

The shared buffer rebalancing system 300 may be enabled to determine a current occupancy of the shared buffer 112. The current occupancy may be an occupancy of receive and/or transmit pools. For example, as packets are written to and read from the shared buffer 112, the shared buffer rebalancing system 300 may determining an occupancy of receive and transmit pools. The shared buffer rebalancing system 300 may also be capable of determining a delta threshold for the shared buffer 112. In some implementations, a processor 115 of the switch 103 may determine the delta threshold for the shared buffer 112 and inform the shared buffer rebalancing system 300.

A rebalancing system 300 of the switch 103 may receive an occupancy of the receive and/or transmit pools and the delta threshold data from the shared buffer control system 109 and, in response, determine a number of cells 121 of the shared buffer 112 to activate or deactivate. For example, based on the occupancy of the receive and transmit pools and the delta threshold, the rebalancing system 300 may determine a number of cells 121 or blocks of the shared buffer 112 to enable or disable.

The rebalancing system 300 may signal to the shared buffer 112 about which cells 121, blocks, or portions of the buffer 112 can be shut down to save power. Signaling to the shared buffer 112 about which cells 121, blocks, or portions of the buffer 112 can be shut down may comprise transmitting a signal to a controller in communication with the shared buffer 112. In response, the shared buffer 112 may power down the physical RAM of the cell(s) 112 or close logic portion around the physical RAM of the cell(s) 112 to be deactivated. On the other hand, the shared buffer 112 may power up the physical RAM of the cell(s) 112 or open logic portion around the physical RAM of the cell(s) 112 to be activated. As should be appreciated, each cell 121 of the shared buffer 112 may individually be powered on and off and groups of cells may be powered on/off at the same time.

As described herein, powered down or deactivated cells 121 may comprise RAMs which are on standby or in a sleep mode or physically powered off. Using a system as described herein, non-required blocks can be shutdown saving idle power and leakage power during idle times. When utilization of the shared buffer 121 increases, a system as described herein enables the shared buffer control system 109 of the switch 103 to detect the increase and instruct the shared buffer 112 to activate one or more portions to keep up with the demand. On the other hand, when utilization of the shared buffer 121 decreases, a system as described herein enables the shared buffer control system 109 of the switch 103 to detect the decrease and instruct the shared buffer 112 to deactivate one or more portions based on the reduced demand.

The number of active cells 121 of the shared buffer 112 may be proportional to a potential data rate and an amount of time required to respond to an increase in data. For example, a 100 TB switch may be capable of receiving 3 MB in around 300 ns. A cell 121 of RAM of the shared buffer 112 may require around 200 ns to be powered on and electrical limitations may limit a number of cells 121 which may be enabled simultaneously. As a result, the shared buffer 112 may not be capable of activating cells 121 in real time as a packet needing a shared buffer cell is received. For this reason, a buffer of unused but active cells, such as illustrated in FIG. 2, is used to prevent the loss of data due to μBursts or congestion.

In some implementations, particular flows, such as TCP communication sessions, may be assigned dedicated cells 121 of the shared buffer 112. Each flow may be associated with a different buffer and a different set of activated cells 121. Portions of the shared buffer 112 may be allocated or assigned to each flow ingressing the switch 103. Because a single flow may be received by multiple ports 106a-d, it should be appreciated ports 106a-d may share assigned cells 121 of the shared buffer 112.

The shared buffer control system 109 and the rebalancing system 300 may be performed by the same or different controller circuits. In some implementations, the shared buffer control system 109 and the rebalancing system may be ASICs, dedicated circuits, microcontrollers, one or more CPUs, or software functions executed by a processor.

Figure 4:
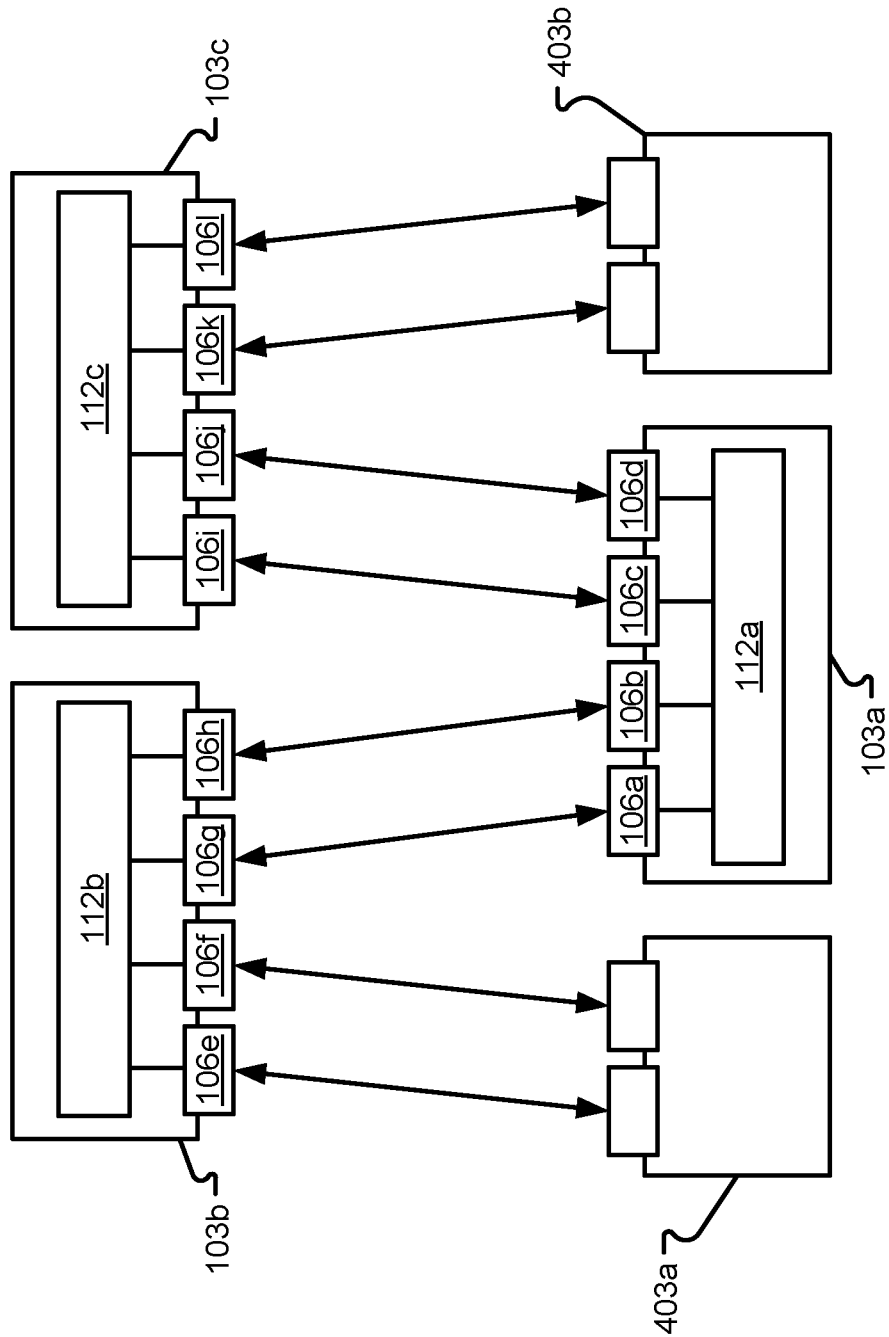
FIG. 4 is a block diagram depicting an illustrative configuration of a network of switches in accordance with at least some embodiments of the present disclosure.

As illustrated in FIG. 4, a switch 103a may be connected to a number of nodes such as other switches 103b, 103c, and/or other computing devices 403a, 403b, forming a network. The systems and methods described herein may be performed by a switch 103a-c in a network of interconnected nodes. Multiple switches 103a-c, and/or other computing devices 403a, 403b, can be interconnected in a variety of topologies, such as star, ring, or mesh, depending upon the specific requirements and resilience needed for the network. For instance, in a star topology, a plurality of switches may be connected to a central switch, whereas in a ring topology, each switch may be connected to two other switches in a closed loop. In a mesh topology, each switch may be interconnected with every other switch in the network. These robust structures afford a level of redundancy, as there are multiple paths for data to travel, ensuring that network functionality can be maintained even in the event of a switch failure.

Each switch 103a-c may be a switch 103 such as illustrated in FIG. 1 or may be any type of computing device. Each port 106a-1 of each switch 103a-c may be connected to the same or a different node. In the example illustrated in FIG. 4, a first switch 103a is connected via two ports 106a-b to two ports 106g-h of a second switch 103b and via two ports 106c-d to two ports 106i-j of a third switch 103c. Each of the second and third switches 103b-c are connected to other computing devices 403a-b via two ports 106e, 106f, 106k, 106l. Each of the switches 103a-c may comprise a respective shared buffer 112a-c. When a packet is received via a port 106a-1 of a switch 103a-c, the packet may be stored in a shared buffer 112a-c of the respective switch 103a-c.

Figure 5:
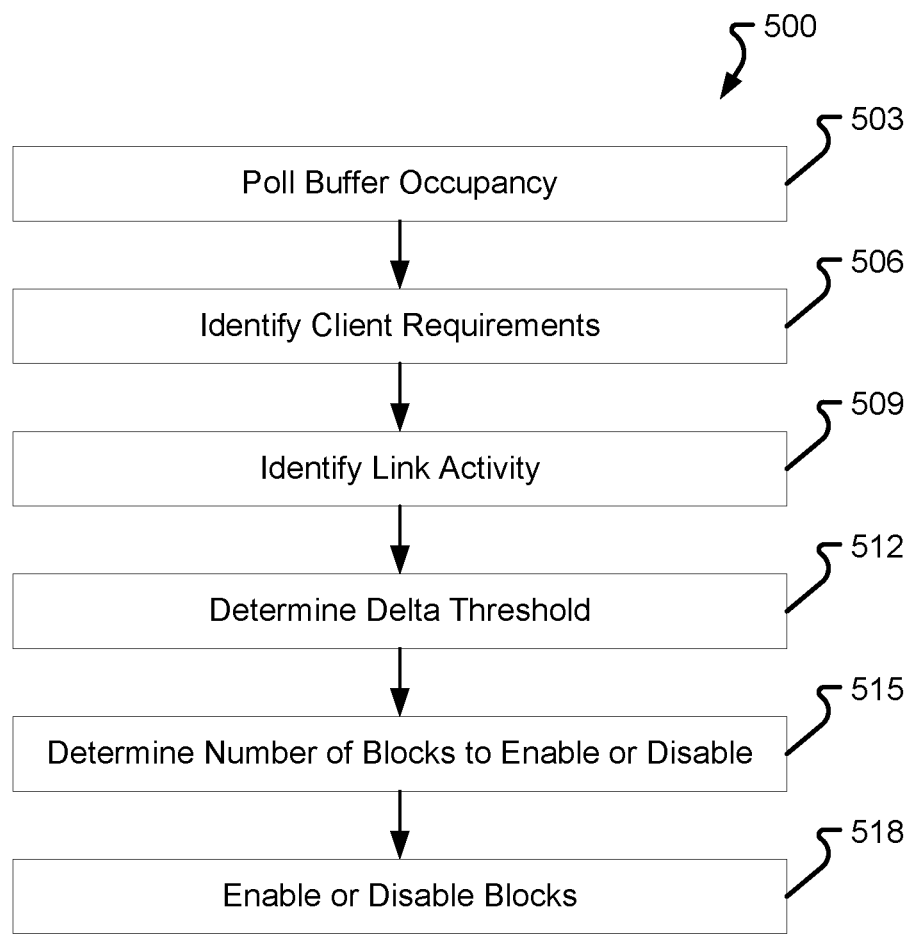
FIG. 5 is a flowchart depicting an illustrative configuration of a method in accordance with at least some embodiments of the present disclosure.

As illustrated in FIG. 5, a method 500 as described herein may be performed by a switch 103, or other computing device, in accordance with one or more of the embodiments described herein. The method 500 involves identifying information relating to usage of a shared buffer, determining a number of blocks of the shared buffer to enable or disable based on the information, and enabling or disabling the blocks. While the features of the method 500 are described as being performed by a shared buffer control system 109 of a switch 103, it should be appreciated that one or more of the functions may be performed by a processor 115, a rebalancing system 300, or any other computing device comprised by or in communication with a switch 103.

In some implementations, the method may be performed by a network device such as a NIC, a switch, a controller circuit of a switch, or any computing device including a shared buffer. Data received from a first port of a plurality of ports may in some implementations be stored in a shared buffer prior to being transmitted by a second port of the one or more ports. Furthermore, while the description provided herein relates to the use of a shared-buffer used by ports, it should be appreciated any computing system element capable of writing data in memory may use a shared buffer in the same or similar ways as described herein. As such the systems and methods described herein may be used by any entity which uses a shared buffer. Also, the shared buffer may be one of a plurality of shared buffers. A controller, such as a microprocessor, an ASIC, or any other type of computing element may selectively enable and disable cells of memory of each of the shared buffers in accordance with the method 500 described herein.

At 503, occupancy of a shared buffer 112 of the switch 103 may be determined by the shared buffer control system 109. Determining an occupancy of the shared buffer 112 may comprise determining a current amount of data stored in the shared buffer 112. Buffer occupancy as described herein may refer to a current volume of data or a number of packets residing within a shared buffer 112 at any given moment. In some implementations, determining the occupancy of the shared buffer 112 may comprise determining an occupancy of a receive pool and/or a transmit pool of the shared buffer 112. In some implementations, the shared buffer control system 109 may calculate an amount of data stored in the shared buffer 112 by tracking packets received by ports 106 and written to the shared buffer 112 and packets read or otherwise transmitted from the shared buffer 112.

In some implementations, the shared buffer 112 may be logically divided into a receive pool and a transmit pool. A receive pool may function as a temporary storage area for incoming packets that the switch 103 receives via one or more ports 106. A transmit pool may function as a holding area for packets which are ready for transmission via one or more of the ports 106.

Determining the occupancy of the shared buffer 112 of the switch 103 may comprise polling the occupancy of the shared buffer 112. Polling the occupancy may involve a processor 115 or a shared buffer control system 109 within the switch 103 repeatedly querying or examining the current state of the shared buffer 112, to measure how much of the capacity is being utilized at a specific moment. The polling process could occur at regular intervals, or may be event-driven, triggered by certain conditions or changes in the switch's state. The polling operation may result in a quantitative measure of buffer occupancy, such as a number of packets or a volume of data currently residing in the shared buffer 112.

At 506, the shared buffer control system 109 may identify requirements of remote peers or clients. Requirements of remote peers may comprise client buffer requirements, definitions, and/or rules. In some implementations, each flow for which packets are received by the switch 103 may be associated with a minimum buffer requirement indicating an amount of shared buffer resources required for the flow. Because a single flow of packets may arrive at the switch 103 via a plurality of ports 106, a flow may indicate an amount of storage space to be used for all packets of the flow, regardless of the ingress port 106 from which the packets are received. In some implementations, a virtual quota or a flex quota may be required for a flow.

By determining a current occupancy of the shared buffer 112 and the requirements of remote peers and/or flows, the shared buffer control system 109 may be capable of comparing the amount of available buffer 112 and the required amount of buffer 112 based on the requirements of peers and/or flows.

In some implementations, client buffer requirements may refer to a specific storage capacity needed for the shared buffer 112 to handle a particular flow of packets. The requirements may be determined by various factors, including by receiving instructions from a remote peer, or by determining a nature of the flow, a size and/or frequency of the packets of the flow, identifying network conditions, and/or based on quality of service (QOS) expectations. For example, if a flow is characterized by large packets or high-frequency bursts, the flow may necessitate a larger capacity of the shared buffer 112 to accommodate the incoming data and prevent packet loss. Similarly, if network conditions are unstable or egress port availability is limited, a larger capacity of the shared buffer 112 might be required to hold packets. Also, certain QoS parameters, such as low latency or high reliability, might impose specific buffer capacity requirements. Instructions from a remote peer may include the remote peer explicitly setting a capacity of the shared buffer 112. The capacity of the shared buffer 112 may be set by a remote peer may be either an overall capacity of the shared buffer 112, a capacity for a particular flow or communication session, or a capacity for a particular peer or node communicating with the switch 103.

In some implementations, the resources of the shared buffer 112 may comprise hierarchies. For example, and as described above, the shared buffer 112 may be logically divided into a receive pool and a transmit pool, or a particular flow may be linked to a particular shared buffer pool. The resources available to flows linked/assigned to a particular pool may be limited by the amount of available buffer in that particular pool.

At 509, the shared buffer control system 109 or the processor 115 may identify link activity within the switch 103. Identifying link activity may involve monitoring an operational status and/or data traffic activity of one or more ports 106. One such indicator of link activity could be provided by a Serializer/Deserializer Physical Layer device (SerDes PHY). A SerDes PHY of the switch 103 may be enabled to indicate whether a link is active or inactive, and whether data traffic is arriving on the link or not. Such information may be used by the shared buffer control system 109 in managing the shared buffer 112.

In some implementations, the shared buffer control system 109 may also be able to identify data transmission rates of one or more of ports 106. The data transmission rate of a port 106, which may be expressed in terms of bits per second (bps), may indicate the volume of data that the port 106 is capable of sending and/or receiving per unit time. The data transmission rate could be determined by various factors, including hardware specifications of the port 106, network protocols in use, and physical conditions of a network link connected to the port 106.

At 512, the shared buffer control system 109 or the processor 115 may determine a delta threshold. The delta threshold may be a number of cells 121 of the shared buffer 112 which may be active (or enabled) but not currently storing data. The delta threshold may be used to mitigate feedback, prevent packet loss, and otherwise avoid issues with congestion. The delta threshold may be calculated in terms of a number of packets or an amount of data which the shared buffer 112 should be capable of storing in addition to the current usage at a moment's notice.

In some implementations, the delta threshold may be dynamic or static. For example, a dynamic delta threshold may be a hardware-based algorithm. The delta threshold may be relative to one or more of a rate at which the one or more ports of the network device are capable of sending and receiving data and/or a quota for one or more packet flows, among other factors.

In some implementations, the delta threshold may be set based on a set percentage of the current buffer usage. For example, the delta threshold may be ten percent of the current buffer usage. In such a scenario, if one hundred cells 121 of the shared buffer 112 are in use, the delta threshold may be ten cells. In some implementations, the delta threshold may be set based on the buffer occupancy, client requirements, and link activity. For example, the delta threshold may be set based on a percentage of the buffer occupancy in addition to an amount of space needed based on client requirements and based on link activity. As a result, the delta threshold may be set to an amount of space sufficient to handle congestion or µBurst events.

AT 515, the shared buffer control system 109 or the processor 115 may determine a number of blocks (or cells) to enable or disable. To determine a number of blocks (or cells) to enable or disable, the shared buffer control system 109 or the processor 115 may determine a current number of active cells within the shared buffer 112. Determining a current number of active cells within a shared buffer 112 may involve polling an operational status of each cell or retrieving such information from a maintained log or a data structure. The active cells might represent those units currently capable of handling received data.

Next, the shared buffer control system 109 or the processor 115 may determine a goal total number of active cells. The goal total number of active cells may be a sum of the current buffer occupancy and the determined delta threshold. Based on the determined current and goal total number of cells, the shared buffer control system 109 or the processor 115 may calculate how many cells should be activated or deactivated to align the current active cell count with the goal total number of cells. If the current number is less than the goal, the shared buffer control system 109 or the processor 115 may determine a number of cells to activate. Conversely, if the current number is greater than the goal, the shared buffer control system 109 or the processor 115 may determine a number of cells to deactivate.

At 518, the shared buffer control system 109 or the processor 115 may proceed to enable or disable the determined number of cells to adjust the total current number of active cells to the goal number of active cells. The activation or deactivation of cells could involve turning on or off power to the cells, flipping a switch or transistor, or directing the ports to write data to or not write data to cells. This step might be performed individually for each identified cell or simultaneously for a group or block of cells.

In some implementations, a controller circuit may selectively enable and disable cells of memory of the shared buffer as needed based at least in part on the current occupancy, or an amount of data stored in the shared buffer, as described above. The controller can also enable or disable cells based on link activity, such as a Serdes PHY indicating a link is active and traffic is arriving or is not arriving. In this way, cells of memory may be disabled or enabled in response to one or more ports transmitting data, in response to detecting a decrease in the amount of data stored in the shared buffer, based on rules associated with one or more clients, detecting an increase in the amount of data stored in the shared buffer and detecting a shared-buffer profile requires additional buffer, one or more ports receiving data, link activity, when a shared-buffer profile requires more buffer, when keeping fairness between active ports requires more buffer available, and/or other factors.

Disabling cells of memory may in some implementations comprise switching off power to the cells, putting the cells into a sleep mode, closing logic connected to the cells, putting the logic into an idle mode, and/or transmitting a signal to a controller in communication with the shared buffer.

Power consumption of the shared buffer 112 may be in proportion to a number of enabled cells of memory. As more cells are enabled, power consumption may increase, while as more cells are disabled, power consumption may decrease. As such, using a system as described herein, power consumption may be reduced when possible based on buffer occupancy, link activity, client, or remote peer rules, and/or other factors.

In one or more embodiments of the present disclosure, the method 500, after executing, may return to 503 and recommence the process. In some implementations, the repetition of method 500 may occur without delay. In such cases, as soon as the method 500 concludes, the method 500 may immediately begin the next iteration. This arrangement could allow for a continuous execution of method 500. In some implementations, a pause for a predetermined amount of time may occur between successive iterations of method 500. The duration of the pause may be specified as per the operational needs of the method such as by a user.

The present disclosure encompasses methods with fewer than all of the steps identified in FIG. 5 (and the corresponding description of the method), as well as methods that include additional steps beyond those identified in FIG. 5 (and the corresponding description of the method). The present disclosure also encompasses methods that comprise one or more steps from the methods described herein, and one or more steps from any other method described herein.

Embodiments of the present disclosure include a network device, comprising: a shared buffer comprising a plurality of cells of memory; one or more ports to one or more of read data from the shared buffer and write data to the shared buffer; and a controller circuit to selectively enable and disable cells of memory of the shared buffer based at least in part on an amount of data stored in the shared buffer.

Embodiments of the present disclosure also include a switch, comprising: a shared buffer comprising a plurality of cells of memory; one or more ports to one or more of read data from the shared buffer and write data to the shared buffer; and a controller circuit to selectively enable and disable cells of memory of the shared buffer based at least in part on an amount of data stored in the shared buffer.

Embodiments of the present disclosure also include a NIC, comprising: a shared buffer comprising a plurality of cells of memory; one or more ports to one or more of read data from the shared buffer and write data to the shared buffer; and a controller circuit to selectively enable and disable cells of memory of the shared buffer based at least in part on an amount of data stored in the shared buffer.

Aspects of the above network device, switch, and/or NIC include wherein the controller circuit selectively enables and disables cells of memory of the shared buffer based on rules associated with one or more clients.

Aspects of the above network device, switch, and/or NIC include wherein the controller circuit calculates a number of cells to one of enable and disable based on the amount of data stored in the shared buffer and a threshold.

Aspects of the above network device, switch, and/or NIC include wherein the threshold indicates a number of cells.

Aspects of the above network device, switch, and/or NIC include wherein the threshold is a dynamic threshold.

Aspects of the above network device, switch, and/or NIC include wherein the threshold is relative to one or more of a rate at which the one or more ports of the network device are capable of sending and receiving data and a quota for one or more packet flows.

Aspects of the above network device, switch, and/or NIC include wherein disabling cells of memory comprises switching off power to the cells.

Aspects of the above network device, switch, and/or NIC include wherein disabling cells of memory comprises putting the cells into a sleep mode.

Aspects of the above network device, switch, and/or NIC include wherein disabling cells of memory comprises closing logic connected to the cells.

Aspects of the above network device, switch, and/or NIC include wherein disabling cells of memory comprises putting the logic into an idle mode.

Aspects of the above network device, switch, and/or NIC include wherein the controller circuit calculates the amount of data stored in the shared buffer by tracking received and transmitted packets.

Aspects of the above network device, switch, and/or NIC include wherein the controller circuit enables cells of memory in response to one or more of the one or more ports receiving data and link activity.

Aspects of the above network device, switch, and/or NIC include wherein the controller circuit enables cells of memory in response to one or more of detecting an increase in the amount of data stored in the shared buffer, detecting a shared-buffer profile requires additional buffer, and receiving instructions from a remote device.

Aspects of the above network device, switch, and/or NIC include wherein the controller circuit disables cells of memory in response to the one or more ports transmitting data.

Aspects of the above network device, switch, and/or NIC include wherein the controller circuit disables cells of memory in response to one or more of detecting a decrease in the amount of data stored in the shared buffer and receiving instructions from a remote device.

Aspects of the above network device, switch, and/or NIC include wherein the controller circuit selectively enables and disables cells of memory of the shared buffer by transmitting a signal to a controller in communication with the shared buffer.

Aspects of the above network device, switch, and/or NIC include wherein data received from a first port of the one or more ports is stored in the shared buffer prior to being transmitted by a second port of the one or more ports.

Aspects of the above network device, switch, and/or NIC include wherein the shared buffer is one of a plurality of shared buffers, and wherein the controller selectively enables and disables cells of memory of each of the shared buffers.

It is to be appreciated that any feature described herein can be claimed in combination with any other feature(s) as described herein, regardless of whether the features come from the same described embodiment.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A network device, comprising:
   a shared buffer comprising a plurality of cells of memory;

one or more ports to one or more of read data from the shared buffer and write data to the shared buffer; and a controller circuit to selectively enable and disable cells of memory of the shared buffer based at least in part on an amount of data stored in the shared buffer.

2. The network device of claim 1, wherein the controller circuit selectively enables and disables cells of memory of the shared buffer based on rules associated with one or more clients.

3. The network device of claim 1, wherein the controller circuit calculates a number of cells to one of enable and disable based on the amount of data stored in the shared buffer and a threshold.

4. The network device of claim 3, wherein the threshold indicates a number of cells.

5. The network device of claim 3, wherein the threshold is a dynamic threshold.

6. The network device of claim 3, wherein the threshold is relative to one or more of a rate at which the one or more ports of the network device are capable of sending and receiving data and a quota for one or more packet flows.

7. The network device of claim 1, wherein disabling cells of memory comprises switching off power to the cells.

8. The network device of claim 1, wherein disabling cells of memory comprises putting the cells into a sleep mode.

9. The network device of claim 1, wherein disabling cells of memory comprises closing logic connected to the cells.

10. The network device of claim 9, wherein disabling cells of memory comprises putting the logic into an idle mode.

11. The network device of claim 1, wherein the controller circuit calculates the amount of data stored in the shared buffer by tracking received and transmitted packets.

12. The network device of claim 1, wherein the controller circuit enables cells of memory in response to one or more of the one or more ports receiving data and link activity.

13. The network device of claim 1, wherein the controller circuit enables cells of memory in response to one or more of detecting an increase in the amount of data stored in the shared buffer, detecting a shared-buffer profile requires additional buffer, and receiving instructions from a remote device.

14. The network device of claim 1, wherein the controller circuit disables cells of memory in response to the one or more ports transmitting data.

15. The network device of claim 1, wherein the controller circuit disables cells of memory in response to one or more of detecting a decrease in the amount of data stored in the shared buffer and receiving instructions from a remote device.

16. The network device of claim 1, wherein the controller circuit selectively enables and disables cells of memory of the shared buffer by transmitting a signal to a controller in communication with the shared buffer.

17. The network device of claim 1, wherein data received from a first port of the one or more ports is stored in the shared buffer prior to being transmitted by a second port of the one or more ports.

18. The network device of claim 1, wherein the shared buffer is one of a plurality of shared buffers, and wherein the controller selectively enables and disables cells of memory of each of the shared buffers.

19. A switch, comprising:

a shared buffer comprising a plurality of cells of memory;

one or more ports to one or more of read data from the shared buffer and write data to the shared buffer; and a controller circuit to selectively enable and disable cells of memory of the shared buffer based at least in part on an amount of data stored in the shared buffer.

20. A network interface controller, comprising:

a shared buffer comprising a plurality of cells of memory;

one or more ports to one or more of read data from the shared buffer and write data to the shared buffer; and a controller circuit to selectively enable and disable cells of memory of the shared buffer based at least in part on an amount of data stored in the shared buffer.

* * * * *